(12) United States Patent
Britton

(10) Patent No.: US 11,898,686 B2
(45) Date of Patent: Feb. 13, 2024

(54) PIPE REPAIR

(71) Applicant: Turnbull Infrastructure & Utilities Limited, Bath (GB)

(72) Inventor: Julian Britton, Burnham on Sea (GB)

(73) Assignee: Turnbull Infrastructure & Utilities Limited, Bath (GB)

(*) Notice: Subject to any disclaimer, the term of this patent is extended or adjusted under 35 U.S.C. 154(b) by 0 days.

(21) Appl. No.: 18/108,506

(22) Filed: Feb. 10, 2023

(65) Prior Publication Data
US 2023/0194036 A1 Jun. 22, 2023

Related U.S. Application Data

(63) Continuation of application No. 16/686,038, filed on Nov. 15, 2019, now Pat. No. 11,585,479.

(30) Foreign Application Priority Data

Nov. 16, 2018 (GB) ...................................... 1818746

(51) Int. Cl.
*F16L 55/16* (2006.01)
*F16L 55/44* (2006.01)
(Continued)

(52) U.S. Cl.
CPC ............ *F16L 55/44* (2013.01); *F16L 55/18* (2013.01); *F16L 55/30* (2013.01); *E03F 2003/065* (2013.01); *F16L 2101/10* (2013.01)

(58) Field of Classification Search
CPC . F16L 55/18; F16L 55/44; F16L 55/30; E03F 2003/065
(Continued)

(56) References Cited

U.S. PATENT DOCUMENTS 2,742,259 A * 4/1956 Boucher ................. F16L 55/30
                                                                                                 104/38
3,028,915 A     4/1962 Jennings
(Continued)

FOREIGN PATENT DOCUMENTS

| CN | 108302280 A | 7/2018 |
| GB | 2471579 A | 1/2011 |

(Continued)

OTHER PUBLICATIONS

Search Report for GB Patent Application No. 1818746.8 dated May 3, 2019, 4 pages.
(Continued)

*Primary Examiner* — James F Hook
(74) *Attorney, Agent, or Firm* — Dinsmore & Shohl LLP

(57) ABSTRACT

The present disclosure relates to a method for repairing a partially collapsed pipe. The method comprises fitting a mesh stent around the outside of an actuation assembly of a pipe repair apparatus, and positioning the pipe repair apparatus within a portion of the pipe, at least a part of the portion of the pipe being partially collapsed. The method also comprises causing actuation between a retracted configuration and an extended configuration such that the partially collapsed part of the pipe changes from a partially collapsed form towards a non-collapsed form. The method also comprises removing the pipe repair apparatus from the pipe and leaving the mesh stent in the portion of the pipe.

20 Claims, 13 Drawing Sheets

(51) Int. Cl.
*F16L 55/18* (2006.01)
*F16L 55/30* (2006.01)
*F16L 101/10* (2006.01)
*E03F 3/06* (2006.01)

(58) Field of Classification Search
USPC .................. 138/97, 98; 405/184.3, 184.2
See application file for complete search history.

(56) References Cited

U.S. PATENT DOCUMENTS

| | | | |
|---|---|---|---|
| 4,252,152 A | 2/1981 | Martin et al. | |
| 4,386,629 A | 6/1983 | Cook et al. | |
| 4,848,964 A | 7/1989 | Yarnell | |
| 4,930,542 A | 6/1990 | Winkle et al. | |
| 4,991,651 A * | 2/1991 | Campbell | F16L 55/32 |
| | | | 138/97 |
| 5,076,730 A | 12/1991 | Bergey | |
| 5,190,705 A | 3/1993 | Corazza | |
| 5,199,463 A | 4/1993 | Lippiatt | |
| 6,626,447 B2 | 9/2003 | Nelson et al. | |
| 11,585,479 B2 * | 2/2023 | Britton | F16L 55/1653 |
| 11,698,160 B2 * | 7/2023 | Badger | F16L 55/32 |
| | | | 138/98 |
| 2002/0144822 A1 | 10/2002 | Hackworth et al. | |
| 2002/0190682 A1 | 12/2002 | Schempf et al. | |
| 2004/0136786 A1 * | 7/2004 | Bateman | F16L 55/1655 |
| | | | 405/184.2 |
| 2008/0141474 A1 * | 6/2008 | Kapustin | B08B 9/0557 |
| | | | 15/104.09 |
| 2008/0181727 A1 | 7/2008 | Crane | |
| 2016/0178108 A1 | 6/2016 | Ehsani | |
| 2018/0238484 A1 | 8/2018 | Syed | |
| 2018/0326443 A1 * | 11/2018 | Weisenberg | F16L 55/32 |

FOREIGN PATENT DOCUMENTS

| | | |
|---|---|---|
| GB | 2550428 A | 11/2017 |
| GB | 2553208 A | 2/2018 |
| KR | 20090056529 A | 6/2009 |
| KR | 101067068 B1 | 9/2011 |
| WO | 1997011306 A1 | 3/1997 |

OTHER PUBLICATIONS

Examination Report for European Patent Application No. 19209175.9, dated Mar. 21, 2022, 4 pages.
Examination Report for GB Patent Application No. GB1818746.8, dated May 19, 2022, 5 pages.
Intellectual Property Corporation of Malaysia, Substantive Examination Adverse Report (Section 30(1)) issued for Malaysian Patent Application No. PI2019006443, dated Mar. 9, 2023, 5 pages.

* cited by examiner

PIPE REPAIR

CROSS-REFERENCE TO RELATED APPLICATIONS

This Application is a continuation of U.S. patent application Ser. No. 16/686,038, filed Nov. 15, 2019, which claims priority to United Kingdom (GB) Application No. 1818746.8, filed Nov. 16, 2018, the contents of each of which are incorporated herein by reference in their entirety.

INTRODUCTION

Technical Field

The present disclosure relates to pipe repair. More particularly, but not exclusively, the present disclosure relates to repairing partially collapsed pipes using a pipe repair apparatus.

BACKGROUND

Pipe repair includes work related to repairing subterranean pipes, such as water pipes and sewage pipes.

Known methods involve use of an expander for straightening partially collapsed pipes. In some known methods, 'rubber packing' is used as the expander, whereby the force against interior walls of the pipe that is being repaired is provided by pneumatic expansion of a rubber balloon. In some such known methods, while straightening the partially collapsed pipe, a coil shaped replacement pipe is fitted around the outside of the expander and the coil shaped replacement pipe is expanded to fit within the damaged section of pipe. Other known methods involve use of hydraulic actuation to expand a coil shaped replacement pipe.

International Patent Application No. WO 97/11306 discloses a hydraulically actuatable expander for straightening and repairing partially collapsed pipelines. The expander comprises a plurality of hydraulic pistons and expander segments and a synchronizing mechanism for synchronizing the expansion. A flexible plate with overlapping edges is arranged around the expander.

Korean Patent Application No. KR 20090056529 discloses a conduit repairing apparatus. The conduit repairing apparatus has a deformation restoration function in the form of an inflating member made of rubber. The apparatus involves the use of hydraulic cylinders and a cylindrically rolled support plate that acts as a replacement pipe. The support plate is coiled around the apparatus and 'clicks' into place once it reaches a specified diameter.

There are at least two issues with the state of the art as it stands. Firstly, the replacement pipe that remains coil shaped once fully expanded (i.e. comprises a section where it overlaps with itself) is not beneficial if the pipe is to be relined. This overlapping portion is known to interfere with the relining layer. In addition, the overlapping section reduces the hydrodynamic conductivity of the pipe. This means that there is greater resistance to liquid flow in the pipe, and greater pressure is required to obtain the same flow rate within the pipe. Secondly, the replacement pipe (or support plate) that uncurls and clicks in place must be prefabricated for the specific pipe diameter. This means that there must either be a large stock of different sized support plates, or a longer wait-time (for example, for manufacture of a prefabricated stent) for repairing the pipe. A further issue is that if the pipe cannot be fully repaired, and only partially repaired, replacement pipes of this nature would be relatively useless as they would be difficult or impossible to click into place.

It would therefore be desirable to provide improved methods for repairing partially collapsed pipes.

BRIEF SUMMARY

According to embodiments, there is a method for repairing a partially collapsed pipe, the method comprising: fitting a mesh stent around the outside of an actuation assembly of a pipe repair apparatus, the actuation assembly comprising a plurality of arms; positioning the pipe repair apparatus within a portion of the pipe, at least a part of the portion of the pipe being partially collapsed; causing actuation, of at least one of the arms in the plurality of arms, between a retracted configuration in which the at least one arm exerts substantially no force against an interior surface of the pipe, and an extended configuration in which the at least one arm extends outwards to exert a force against the mesh stent and the interior surface of the pipe, such that the partially collapsed part of the pipe changes from a partially collapsed form towards a non-collapsed form; and removing the pipe repair apparatus from the pipe and leaving the mesh stent in the portion of the pipe.

The method enables the partially collapsed pipe to be repaired with minimal or no excavation of the ground around the part of the pipe that is partially collapsed. Access may for example be obtained via manholes located at opposite sides of the partially collapsed part of the pipe. Furthermore, it allows the pipe to be repaired quickly and without the need for fitting a replacement pipe because the partially collapsed part of the pipe is pushed back towards a non-collapsed form and held in this position by the stent.

The method also minimizes disruption to human activities above ground because minimal or no excavation is involved, and hence there is minimal or no requirement to implement traffic control measures, or pedestrian diversions for example. Should these be involved, they would be in place for the minimal duration of the repair. Furthermore, the use of a mesh stent means that the mesh stent is able to substantially take the shape of the portion of the pipe that is being repaired, and it provides a uniform expansion. Use of a mesh stent means that even once expanded there are no overlapping edges, and the circumference of the cross-section is a substantially smooth, continuous line. This provides the added benefit that if the pipe were to be relined, there is lower risk of damage to the relining layer. In addition, the mesh stent affords good hydraulic conductivity compared to alternative methods.

According to embodiments, there is a mesh stent for use in repairing a partially collapsed pipe.

According to embodiments, there is a pipe repair apparatus for use in repairing a partially collapsed pipe.

According to embodiments, there is a computer program product comprising a non-transitory computer-readable storage medium having computer readable instructions stored thereon, the computer-readable instructions being executable by a control module of a pipe repair apparatus, to cause the pipe repair apparatus to perform a method of repairing a partially collapsed pipe, the pipe repair apparatus having been positioned within a portion of the pipe, at least a part of the portion of the pipe being partially collapsed, a mesh stent having been fitted around the outside of an actuation assembly of a pipe repair apparatus, the actuation assembly comprising a plurality of arms, the method comprising: causing actuation, of at least one of the arms in the plurality of arms, between a retracted configuration in which the at least one arm exerts substantially no force against an interior surface of the pipe, and an extended configuration in which the at least one arm extends outwards to exert a force against the mesh stent and the interior surface of the pipe, such that the partially collapsed part of the pipe changes from a partially collapsed form towards a non-collapsed form.

It should be appreciated that features described in relation to one embodiments of the present disclosure may be incorporated into other embodiments of the present disclosure. For example, a method embodiment may incorporate any of the features described with reference to an apparatus embodiment and vice versa.

DESCRIPTION OF THE DRAWINGS

Embodiments of the present disclosure will now be described by way of example only with reference to the accompanying schematic drawings of which.

DETAILED DESCRIPTION

Figure 1:
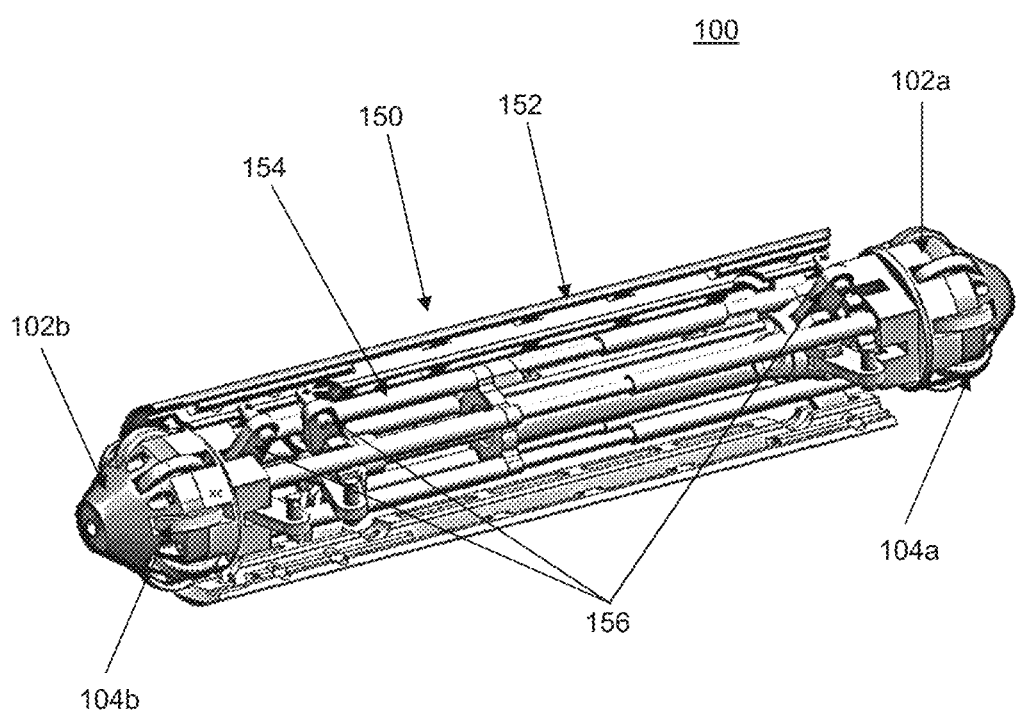
FIG. 1 shows a perspective view of a pipe repair apparatus according to embodiments of the present disclosure.

It should be noted that in the following description and accompanying figures, like or the same reference numeral in different embodiments are used to denote the same or similar features.

FIG. 1 shows a pipe repair apparatus 100 for repairing a partially collapsed pipe according to embodiments of the present disclosure. Pipe repair apparatus 100 comprises an actuation assembly 150. Actuation assembly 150 comprises one or more hydraulic cylinders 154 that are connected to one or more actuation arms 152. The connection between hydraulic cylinders 154 and actuation arms 152 is provided by a number of links 156 (per arm 152). In the example embodiments of FIG. 1, three links 156 connect hydraulic cylinders 154 to respective arms 156, but in other embodiments, different numbers of links/arms are employed. Links 156 are configured to work together, when connected to actuation arm 152, to move outwards from actuation assembly 150 when hydraulic cylinders 154 are being actuated. Arms 152 are distributed around the circumference of actuation assembly 150 (some of arms 152 are not shown here as FIG. 1 has been drawn to show the inner workings of actuation assembly 150). When a force is applied through the hydraulic fluid into hydraulic cylinders 154, each of arms 152 move out simultaneously, with the same force, and at the same speed.

In the embodiments depicted in FIG. 1, pipe repair apparatus 100 comprises a first wheel attachment 102a for a first set of wheels 104a at a first end, and a second wheel attachment 102b for a second set of wheels 104b at a second end, opposite to the first end. Wheels 104a, 104b are spaced evenly around the circumference of wheel attachments 102a, 102b. This allows pipe repair apparatus 100 to be positioned in any orientation within a partially collapsed pipe that is being repaired, with one or more wheels of each set of wheels 104a, 104b being in contact with a bottom surface of the pipe. Wheels 104a, 104b allow pipe repair apparatus 100 to be moved easily within the pipe, and allows for precise positioning of pipe repair apparatus 100. Wheels 104a, 104b also reduce the risk of pipe repair apparatus 100 being damaged by interior walls of the pipe.

In alternative embodiments of the present disclosure, one or more wheels may be removed from each wheel attachment for each set of wheels if extra clearance is required within the pipe. Removing one or more wheels would reduce the overall diameter of pipe repair apparatus 100 and thus allow it to fit into smaller spaces within the pipe. For example, if a partially collapsed part of the pipe reduced the diameter of the pipe to less than the diameter of pipe repair apparatus 100 with wheels 104a, 104b, but larger than the pipe repair apparatus without wheels 104a, 104b, removing at least one pair of wheels from the wheels 104a, 104b would reduce the ride height of pipe repair apparatus 100 and allow it to fit within the partially collapsed part of the pipe. In alternative embodiments of the present disclosure, arms of larger overall diameters are attached to the actuation assembly so that the pipe repair apparatus can be used in pipes of larger diameter.

In alternative embodiments of the present disclosure, arms 152 do not move simultaneously, or with the same force or speed. Instead, there may be individual hydraulic lines (not shown) supplying each individual hydraulic cylinder 154. Some embodiments employ a control algorithm, along with a control mechanism for controlling the amount and force of the hydraulic fluid in each individual hydraulic line. Thus, each arm 152 can be controlled independently. By use of such embodiments, more or less force can be applied to different segments of the pipe cross-section where appropriate; for example, it may be more appropriate to apply less force in the horizontal direction compared to in the vertical direction. The control algorithm may also control and change the amount of force supplied in each hydraulic line as a function of the resistance to movement that each arm 152 experiences within the pipe during actuation of actuation assembly 150.

In alternative embodiments of the present disclosure, the arms 152 are not hydraulically actuated, and the cylinders 154 are not hydraulic. The actuation may comprise one or more of: hydraulic actuation, pneumatic actuation, and mechanical actuation. The cylinders may be pneumatic, and the arms 152 may be pneumatically actuated, for example. Alternatively, the arms 152 may be mechanically actuated, and there may be no cylinder. Instead of a cylinder, the actuation assembly may comprise one or more servo motors, for example.

Figure 2:
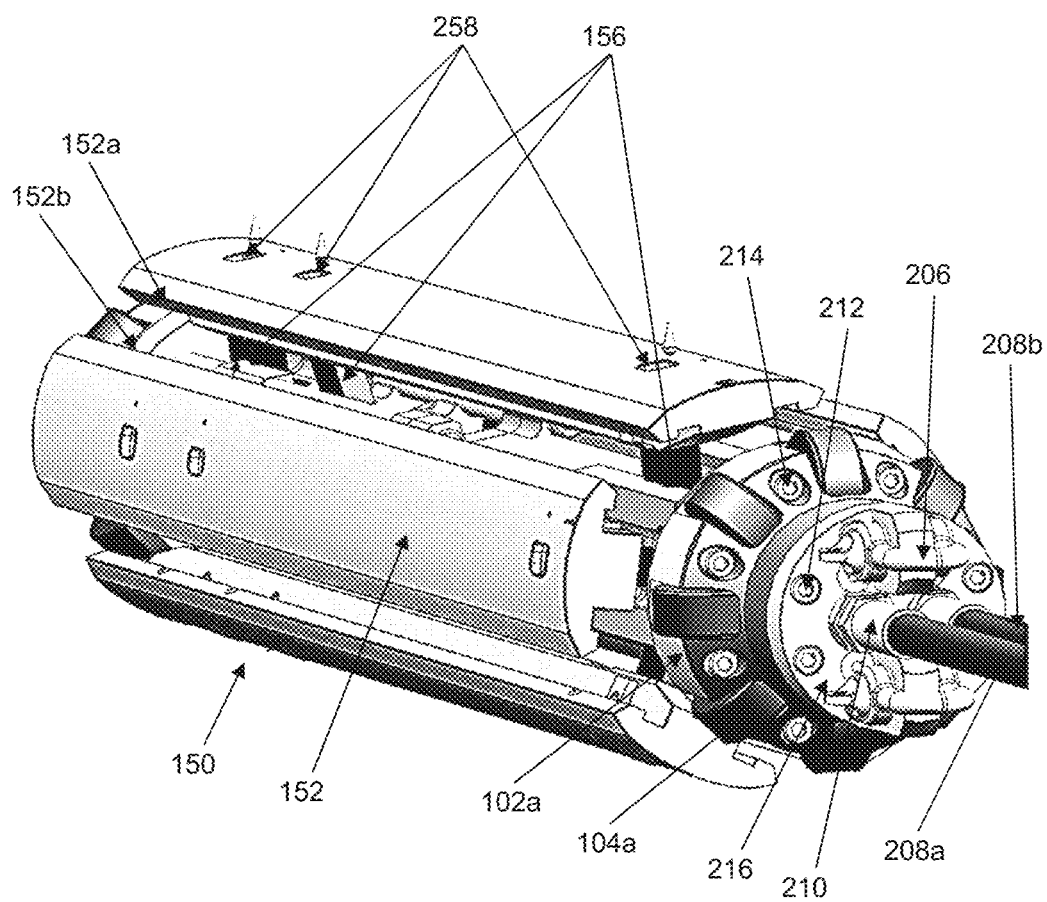
FIG. 2 shows a perspective view of a pipe repair apparatus according to embodiments of the present disclosure.

FIG. 2 shows pipe repair apparatus 100 for repairing a partially collapsed pipe according to embodiments of the present disclosure. Pipe repair apparatus 100 comprises actuation assembly 150 that comprises five hydraulic arms 152 (only four of which are visible in FIG. 2), all of which are connected via three links 156 each to actuation assembly 150. Actuation assembly 150 is actuated and is in an extended configuration. This can be seen because the diameter of actuation assembly 150 is greater than the overall diameter of first set of wheels 104a within wheel attachment 102a. If actuation assembly 150 were in the retracted configuration, then the diameter of actuation assembly 150 would be less than the overall diameter of first set of wheels 104a within wheel attachment 102a. In addition, if actuation assembly 150 were to be in the retracted configuration, long edges of each arm 152a would be in contact with—or in the least be very close to—an adjacent arm 152b to provide a substantially continuous outer surface of actuation assembly 150 with substantially no gaps between arms 152. Each of the links 156 are connected to arms 152 via a pin joint (not shown). In embodiments, each arm 152 comprises a pin joint access hole 258 for each pin joint. The pin joint access holes 258 facilitate easy maintenance and allow an operator to apply lubricant such as oil to the pin joint without having to deconstruct pipe repair apparatus 100.

In the embodiments of FIG. 2, pipe repair apparatus 100 comprises a pair of hydraulic lines 208a, 208b attached at the first end of pipe repair apparatus 100. Hydraulic line 208a is attached to pipe repair apparatus 100 via connector 210. The connector 210 allows hydraulic line 208a to transfer hydraulic fluid to and from pipe repair apparatus 100, and hence to and from the hydraulic cylinders (not shown). The hydraulic cylinders are double acting hydraulic cylinders, i.e. first hydraulic line 208a transfers hydraulic fluid for actuating the actuation assembly 150 into the extended configuration, and second hydraulic line 208b transfers hydraulic fluid for actuating actuation assembly 150 into the retracted configuration.

In embodiments, pipe repair apparatus 100 comprises a pair of first end tether attachment points 206. First end tether attachment points 206 are configured to be attached to a tether (not shown) such that pipe repair apparatus 100 can be pulled out of the pipe, for example on wheels 104a, 104b, without putting any strain on hydraulic lines 208a, 208b.

The first end of pipe repair apparatus 100 also comprises a number of bolts 212, 214 that secure wheels 104a and wheel attachment 102a to the rest of pipe repair apparatus 100. To replace wheels 104a, both sets of bolts 212, 214 are removed, a retainer 216 is removed from pipe repair apparatus 100, and wheels 104a are then free to be replaced.

In alternative embodiments, only a single hydraulic line is connected to pipe repair apparatus 100. In such embodiments, the single hydraulic line may only provide hydraulic fluid to actuation assembly 150 to actuate actuation assembly 150 into the extended configuration. In alternative embodiments, the hydraulic cylinder may belong to a type of hydraulic cylinders called spring return cylinders. The spring return cylinder of alternative embodiments comprises a spring that acts in opposition to the force provided by the hydraulic fluid, and when there is substantially no force provided by the hydraulic fluid, the spring causes the hydraulic cylinder—and hence the actuation assembly—to return to the retracted configuration. The spring of the spring return cylinder biases the hydraulic cylinder, and actuation assembly 100, into the retracted configuration.

Figure 3A:
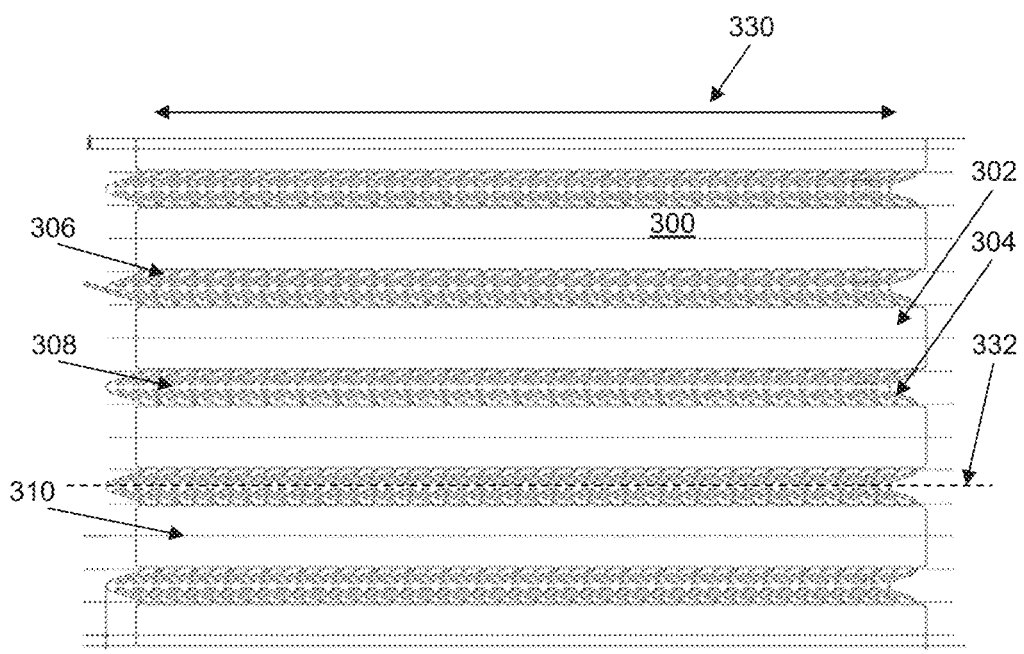
FIG. 3a shows a net of a mesh stent according to embodiments of the present disclosure.

FIG. 3a shows a net of a mesh stent 300 according to embodiments of the present disclosure. The net of the mesh stent 300 is formed of a repeating pattern of regularly spaced, solid, continuous, rectangular metal portions 302, and regularly spaced, metal mesh portions 304, positioned in-between each of the rectangular portions 302. In the example embodiments depicted in FIG. 3a, there are five mesh portions 304 in total in the net of the mesh stent 300, but other embodiments may involve different numbers of mesh portions. The direction of the length dimension of the mesh stent is indicated by an arrow 330 and is defined as the direction parallel to the long edges of the rectangular portions 302 (which are arranged parallel to each other). Mesh portions 304 are formed of a number of metal chevrons 306 nested within each other, with a gap in-between each chevron 306, along the length of the net of the mesh stent 300. Each chevron 306 is connected, at its opposite edges, to an edge of an adjoining rectangular portion 302 located either side of mesh portion 304. Each chevron 306 in a single mesh portion 304 is also connected to an adjoining nested chevron by a continuous connecting strip 308 that runs lengthwise relative to the net of the mesh stent 300 and through a central line of symmetry (indicated by dashed line 332) of chevrons 306. Connecting strip 308 ensures that each chevron 306 in each mesh portion 304 moves uniformly when mesh stent 320 is being expanded.

In embodiments, at least one rectangular portion 302 comprises an alignment portion 310 that is located on the line of symmetry that runs parallel to the long edge of each rectangular portion 302. In embodiments of the present disclosure, the alignment portion 310 comprises a bend, kink, or ridge. In alternative embodiments of the present disclosure, the net of the mesh stent may comprise alternative patterns in the mesh portions. Such alternative patterns may for example comprise: a regular crenelated pattern for the mesh portion, interspersed by the same continuous rectangular portions 302; a singular mesh portion for the entire net, formed of repeated chevrons; a singular mesh portion for the entire net, formed of a crenelated pattern; a singular mesh portion for the entire net, formed of any suitable geometric shape that can be tessellated to form a single mesh portion. Any of the aforementioned patterns may comprise a rectangular portion where the rectangular portions are either wider or narrower than the mesh portions.

Figure 3B:
FIGS. 3b and 3c show a formed cylindrical mesh stent according embodiments of the present disclosure.

The net of the mesh stent 300 is rolled along its width and two continuous straight edges 310a, 310b are connected together to form mesh stent 320 of the embodiments depicted in FIG. 3b. The connection may be formed by a weld, for example. Mesh stent 320 comprises a substantially cylindrical cross-section.

The mesh stent according to embodiments of the present disclosure fits snugly onto the outside of the actuation assembly. In alternative embodiments of the present disclosure, the pipe may not be cylindrical in cross section, and may be oval or semi-circular. In such embodiments, the cross-section of the mesh stent may also be so designed to correspond to the cross-section of the pipe. The mesh stent may be rigid. The mesh stent may be rigid in a non-expanded form and/or in an expanded form. The expanded form may correspond to the extended configuration of the plurality of arms. The mesh stent may comprise metal. The mesh stent may comprise steel. Having a rigid mesh stent helps ensure that the partially collapsed part of the pipe stays in the non-collapsed form, after removal of the pipe repair apparatus from the pipe.

In embodiments of the present disclosure where at least one rectangular portion 302 comprises alignment portion 310, when net of mesh stent 300 is rolled to form mesh stent 320, the alignment portions may form a bend, kink, or ridge that protrudes outwards from mesh stent 320.

Figure 3C:
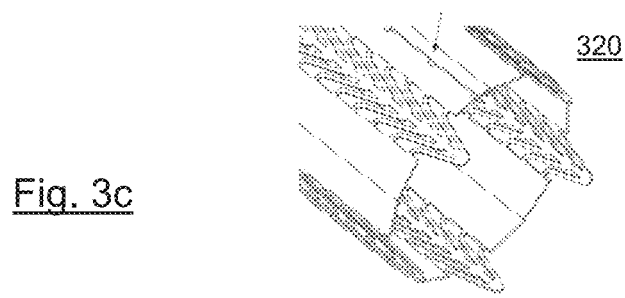

A perspective view of an end of mesh stent 320 is shown in the embodiments of FIG. 3c. FIG. 3c shows the cylindrical cross-section of mesh stent 320.

FIGS. 4a to 4f depict how mesh stent 320 is fitted onto the outside of actuation assembly 150 to form pipe repair apparatus 400 according to embodiments of the present disclosure.

In embodiments of the present disclosure, fitting mesh stent 320 around the outside of actuation assembly 150 comprises: removing one of more wheels of set of wheels 404b from an end of pipe repair apparatus 400 to allow mesh stent 320 to slide onto the outside of actuation assembly 150; and reattaching the one or more wheels to the end of pipe repair apparatus 400. This process of fitting mesh stent 320 according to embodiments of the present disclosure is described in more detail below.

Figure 4A:
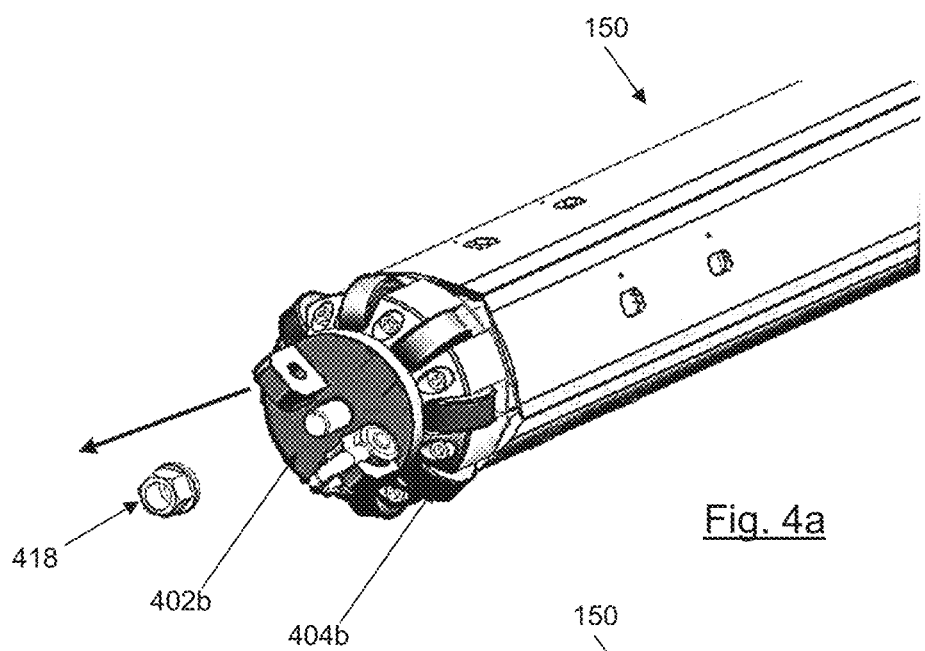
FIGS. 4a to 4f schematically show how the stent is fitted onto the outside of the actuation assembly, according to embodiments of the present disclosure.
Figure 4B:
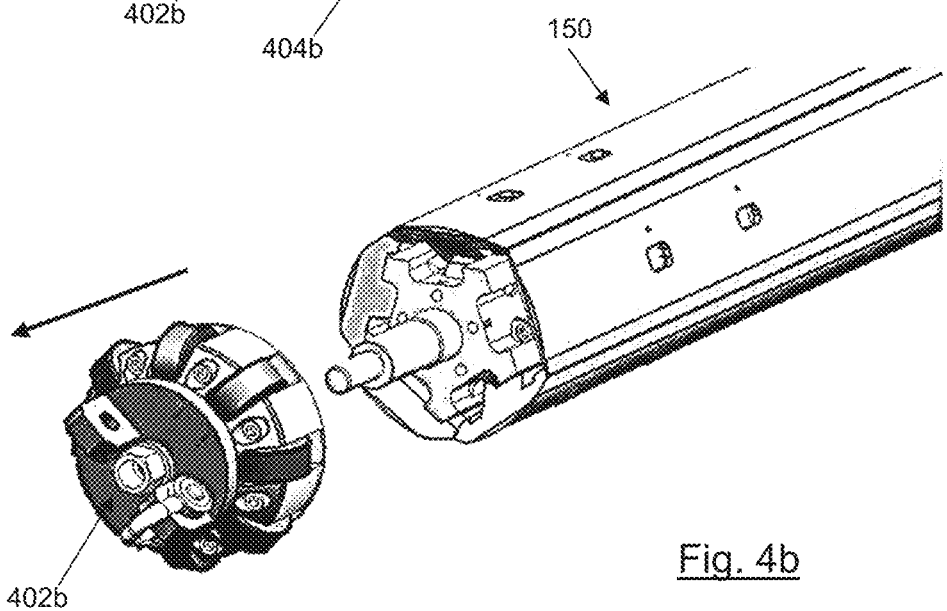
Figure 4C:
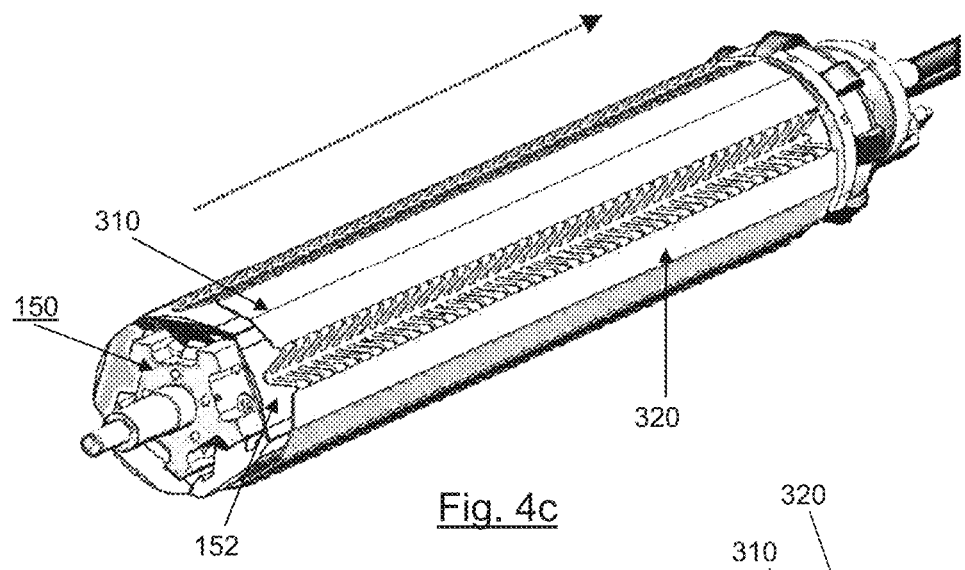
Figure 4D:
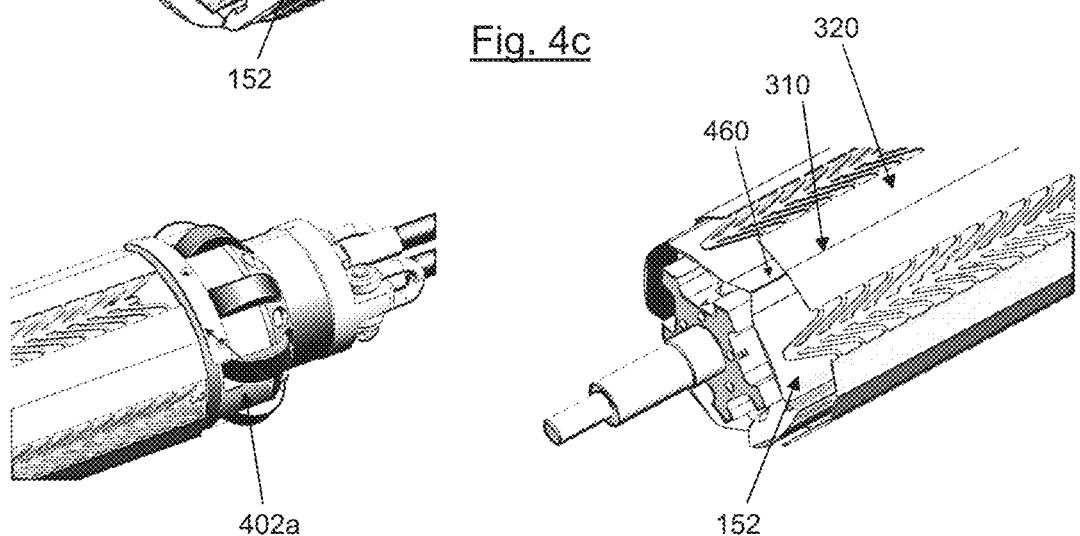

In the embodiments depicted in FIG. 4a, end nut 418 is removed from a second end of the pipe repair apparatus. This allows a second wheel attachment 402b to be removed from the apparatus as shown in the embodiments of FIG. 4b. Mesh stent 320 is then fitted over arms 152 of actuation assembly 150 as shown in the embodiments of FIG. 4c. The length of mesh stent 320 is only slightly shorter than the length of arms 152 of actuation assembly 150, which allows for tolerance in the manufacture of the apparatus. The embodiments of FIG. 4d show that the mesh stent 320 has been pushed along the length of actuation assembly 150 until the end of mesh stent 320 abuts against a first wheel attachment 402a. The abutment occurs because the diameter of wheel attachment 402a is greater than the diameter of actuation assembly 150 (in the retracted configuration) and is also greater than the diameter of mesh stent 320 (also in the retracted configuration). Mesh stent 320 is aligned on arms 152 of actuation assembly 150 such that each rectangular portion 302 is centrally aligned over the alignment portion 460 where the edges of each arm 152 meet. Alignment portion 310 of mesh stent 320 is aligned with alignment portion 460, which is located equidistant between two arms 152 of the plurality of arms of the pipe repair apparatus. This ensures that mesh stent 320 doesn't slide circumferentially around the outside of actuation assembly 150, which ensures that mesh portions 304 are centrally aligned with arms 152 of actuation assembly 150, ensuring optimal and uniform expansion of mesh stent 320.

Figure 4E:
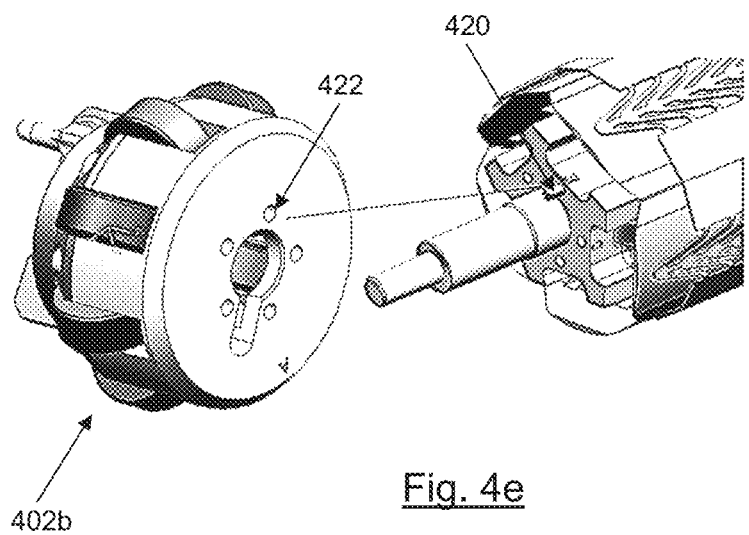
Figure 4F:
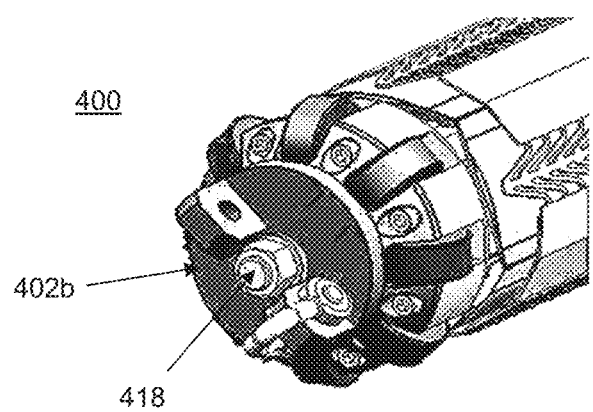

The embodiments of FIG. 4e show that once mesh stent 320 has been fitted, second wheel attachment 402b is reattached onto the second end of pipe repair apparatus 400. Pipe repair apparatus 400 comprises a pin 420, and second wheel attachment 402b comprises a hole 422. Pin 420 is configured to fit within hole 422 when second wheel attachment 402b is attached to pipe repair apparatus 400. This ensures that second wheel attachment 402b is reattached in the correct orientation relative to the rest of pipe repair apparatus 400. In embodiments of the present disclosure, FIG. 4f depicts pipe repair apparatus 400 once second wheel attachment 402b has been reattached, and nut 418 has been screwed back in place to secure second wheel attachment 402b to the rest of pipe repair apparatus 400.

In alternative embodiments of the present disclosure, the mesh stent is not a similar length to the arms of the actuation assembly. In alternative embodiments of the present disclosure, the mesh stent is significantly shorter than the arms of the actuation assembly. The mesh stent may for example be 75%, or 50%, or 25%, or any other suitable fraction of the length of the arms of the actuation assembly. An example of a reason for this is because the size of the portion of the pipe may be significantly less than the length of the arms of the actuation assembly.

Figure 5:
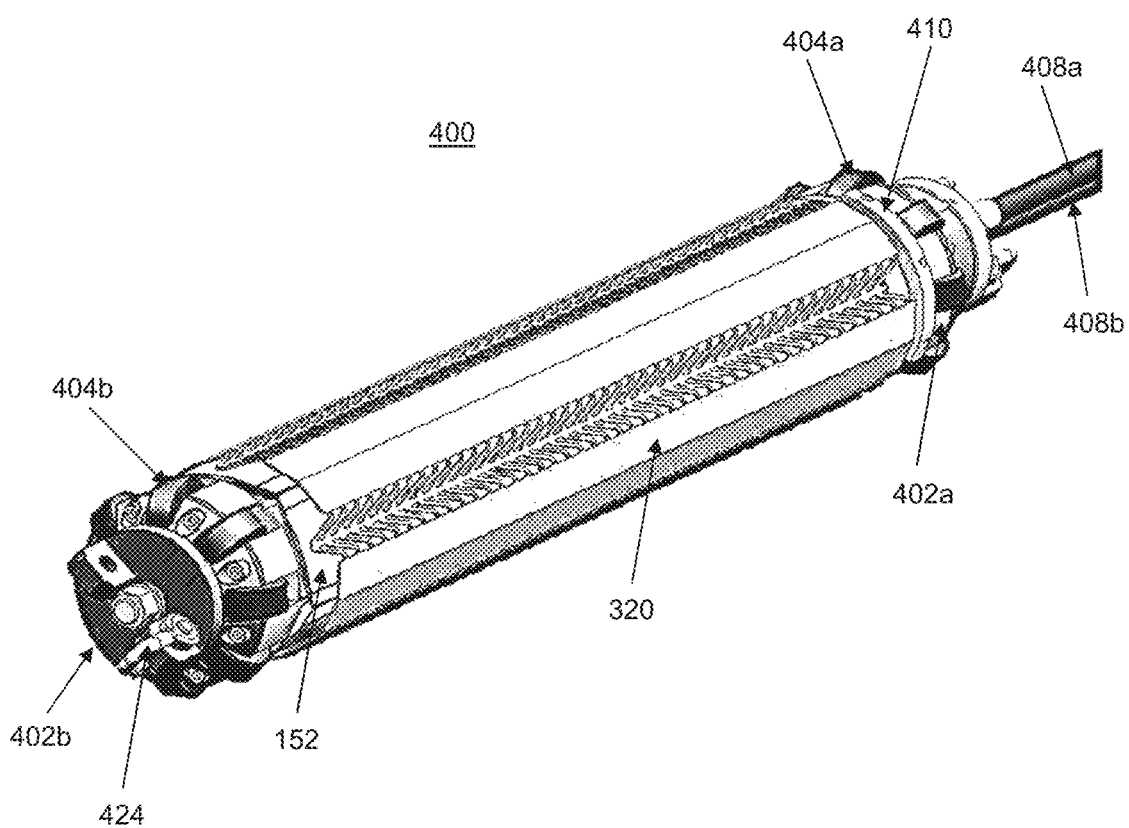
FIG. 5 shows a perspective view of the pipe repair apparatus according to embodiments of the present disclosure.

FIG. 5 shows a perspective view of pipe repair apparatus 400 according to embodiments of the present disclosure. Mesh stent 320 has been placed over arms 152 of actuation assembly 150, as described in the embodiments of FIGS. 4a to 4f. In embodiments, pipe repair apparatus 400 comprises lip 410. Lip 410 extends radially outwards from pipe repair apparatus 400, further than the diameter of mesh stent 320. Therefore, lip 410 ensures that mesh stent 320 does not move whilst pipe repair apparatus 400 is being positioned within pipe 500. Pipe repair apparatus 400 is connected to hydraulic lines 408a, 408b for providing hydraulic fluid to actuation assembly 150. Hydraulic lines 408a, 408b are attached to the first end of pipe repair apparatus 400 where first wheel attachment 402a for first set of wheels 404a is located. Wheel attachment 402a comprises first set of wheels 404a. At the second end of pipe repair apparatus 400, second wheel attachment 402b for second set of wheels 404b is located. Wheel attachment 402b comprises second set of wheels 404b. Second wheel attachment 402b also comprises a second end tether attachment point 424. Second end tether attachment point 424 is configured to be attached to a tether (not shown, but described in relation to the embodiments of FIG. 8) for pulling pipe repair apparatus 400 into the pipe and into position within a portion of the pipe, a part of which is partially collapsed.

In alternative embodiments of the present disclosure, a tether is not used to pull the pipe repair apparatus into the pipe, and instead either one or both sets of wheels of the pipe repair apparatus are motorized. Pipe repair apparatus 400 may comprise a wheel motor, and positioning pipe repair apparatus 400 within the pipe may comprise driving the set/sets of wheels 404a, 404b with the wheel motor. The set/sets of wheels may be controlled externally by an operator, or it/they may controlled by an on-board control module. In embodiments of the present disclosure, the control module is programmed to position the pipe repair apparatus within the portion of the pipe, at least a part of which is partially collapsed, by driving the set/sets of wheels. The pipe repair apparatus may comprise a battery, the battery being used to provide electrical power to the motors that drive the set/sets of wheels. It will also be understood by the skilled person that in embodiments of the present disclosure, part of the maneuvering of the pipe repair apparatus may be with a tether, and another part of the maneuvering may be with motorized wheels: for example, in embodiments of the present disclosure, the tether is used to lower the apparatus into the pipe, and bring the apparatus most of the distance down the pipe; and motorized wheels are used to more finely position the pipe repair apparatus within a precise portion of the pipe, at least a part of which is partially collapsed.

Figure 6:
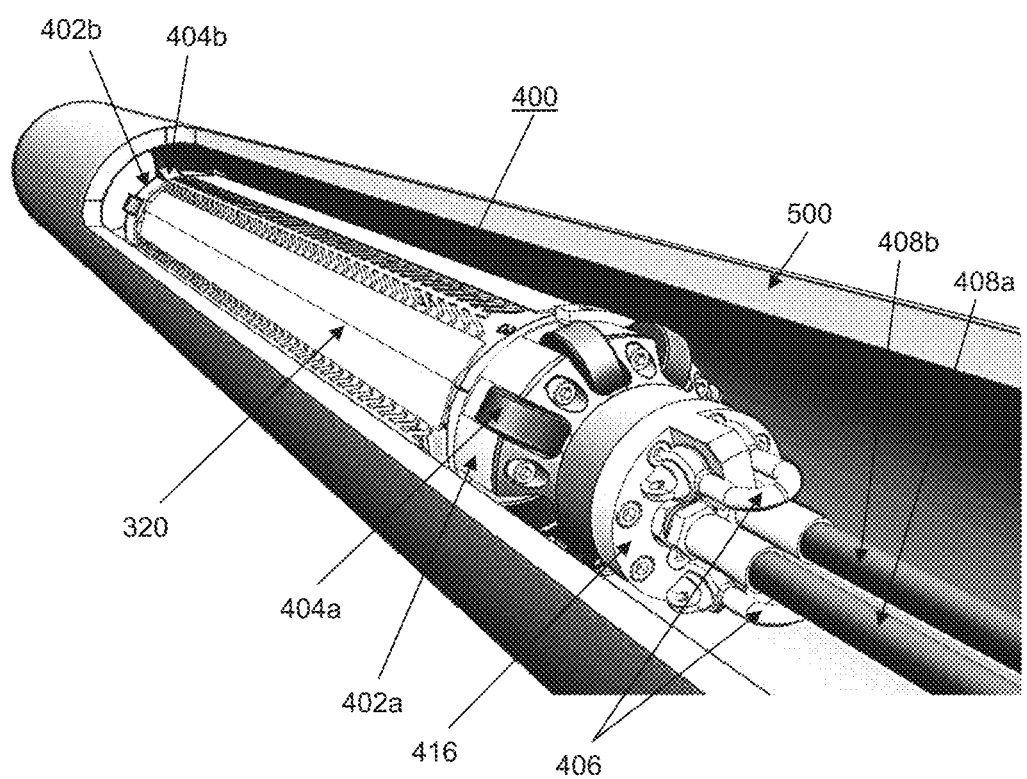
FIG. 6 shows a perspective view of the pipe repair apparatus in a section of a pipe according to embodiments of the present disclosure.

FIG. 6 shows a perspective view of pipe repair apparatus 400 within a section of pipe 500, according to embodiments of the present disclosure. Pipe 500 has illustratively had a section cut away so that pipe repair apparatus 400 can be seen in detail. Pipe repair apparatus 400 of the embodiments of FIG. 6 is the same pipe repair apparatus 400 as described in the embodiments of FIG. 5.

It can be seen that the overall diameter of pipe repair apparatus 400 is less than the inner diameter of pipe 500, so that pipe repair apparatus 400 can move freely on its sets of wheels 404a, 404b along an inner, lower surface of pipe 500.

Pipe repair apparatus 400 is in the retracted configuration, with mesh stent 320 fitted around the arms of the actuation assembly (not shown as hidden from view by stent 320). Hydraulic lines 408a, 408b connect pipe repair apparatus 400 to an external source of hydraulic fluid (not shown). The external source of hydraulic fluid is external to pipe repair apparatus 400 and is outside of pipe 500. The external source of hydraulic fluid also comprises a power source for pressurizing the hydraulic fluid within hydraulic lines 408a, 408b such that actuation of the actuation assembly can take place. The hydraulic actuation is enabled by, and fluidly connected to, the hydraulic power source and/or hydraulic fluid source external to the pipe repair apparatus. According to embodiments of the present disclosure, the hydraulic fluid is chosen such that it does not have a pollution risk should it leak into pipe 400. First wheel attachment 402a comprises a pair of first end tether attachment points 406. The pair of first end tether attachment points 406, in operation, are attached to tethers (not shown) that feed out through pipe 500 to a winch (not shown) external to the pipe 500. These tethers are used to pull pipe repair apparatus 400 out of pipe 500 through an opening, the opening being the route through which pipe repair apparatus 400 originally entered pipe 500. Pipe repair apparatus 400 is not pulled by hydraulic lines 408a, 408b as this would put undue strain on hydraulic lines 408a, 408b and may result in rupture and leakage of hydraulic fluid into pipe 500.

In alternative embodiments of the present disclosure, the source of hydraulic fluid is located within the pipe repair apparatus itself. Keeping the source of hydraulic fluid external to the pipe repair apparatus may allow for a reduction in the weight of the pipe repair apparatus. However, having the source of hydraulic fluid within the pipe repair apparatus would eliminate the need for hydraulic lines that run through the pipe. This means that there are no hydraulic lines that may get snagged on rough surfaces within the pipe, and also means, therefore, that there are no hydraulic lines that are at risk of rupture and leakage of hydraulic fluid. In alternative embodiments of the present disclosure, the power source may also be located within the pipe repair apparatus. This also means that there is no risk of a power cable being snagged within the pipe. Again, this would increase the weight of the pipe repair apparatus, so such an inclusion of a power source within the pipe repair apparatus involves a trade-off.

Figure 7:
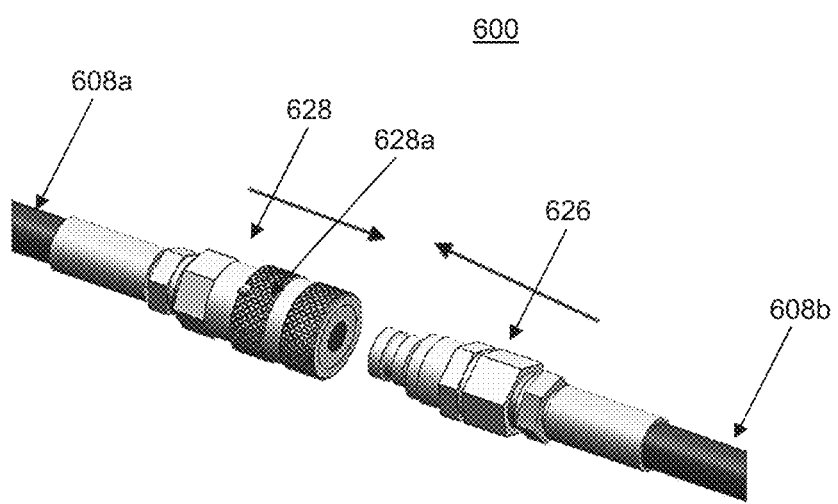
FIG. 7 shows a perspective view of ISO Standard Quick release fittings for hydraulic connections according to embodiments of the present disclosure.

FIG. 7 shows a quick release fitting 600 for hydraulic connections according to embodiments of the present disclosure. In embodiments of the present disclosure, quick release fitting 600 is used to connect two sections of hydraulic lines 608a, 608b together. Quick release fitting 600 conforms to an ISO standard. Quick release fitting 600 comprises a male portion 626 and a female portion 628. Male portion 626 and female portion 628 are fitted together by pushing the two portions together. To 'lock' the two portions together, a collar 628a of female portion 628 is rotated once the two portions are connected in place. The section of hydraulic line 608a that is connected to female portion 628 may be attached to a pipe repair apparatus, and the section of hydraulic line 608b that is connected to male portion 626 may extend to a source of hydraulic fluid (and power source), for example.

FIGS. 8a to 8h show a schematic representation of pipe repair apparatus 400 repairing a partially collapsed pipe according to embodiments of the present disclosure. Embodiments of the present disclosure comprise a method for repairing a partially collapsed pipe, the method comprising: fitting mesh stent 320 around the outside of actuation assembly 150 of pipe repair apparatus 400, actuation assembly 150 comprising a plurality of arms 152; positioning pipe repair apparatus 400 within portion of the pipe 550, at least a part 552 of portion 550 of pipe 500 being partially collapsed; causing actuation, of at least one of arms 152 in the plurality of arms, between a retracted configuration in which the at least one arm 152 exerts substantially no force against an interior surface of pipe 500, and an extended configuration in which the at least one arm 152 extends outwards to exert a force against mesh stent 320 and the interior surface of pipe 500, such that partially collapsed part 552 of pipe 500 changes from a partially collapsed form towards a non-collapsed form; and removing pipe repair apparatus 400 from pipe 500 and leaving mesh stent 320 in portion 550 of pipe 500. The non-collapsed form may be substantially cylindrical in shape.

Figure 8A:
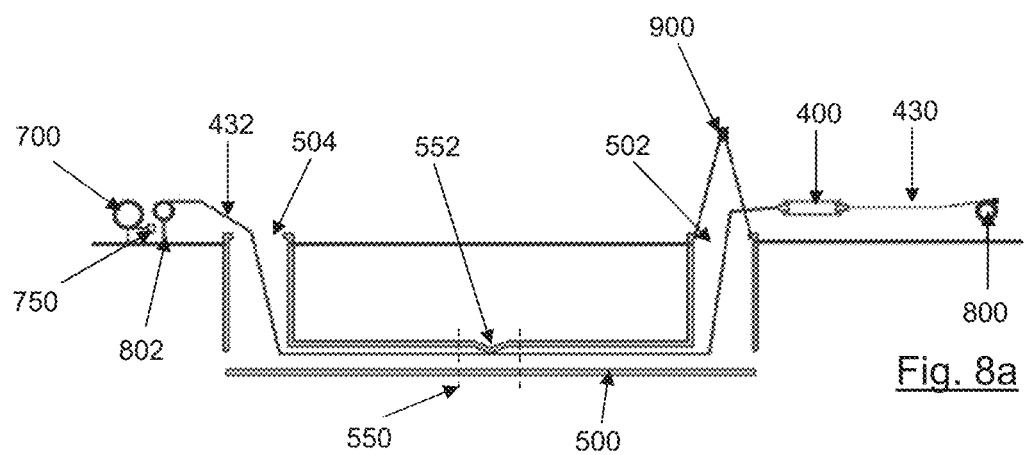
FIGS. 8a to 8h shows a schematic view of a pipe repair apparatus repairing a partially collapsed pipe according embodiments of the present disclosure.

The embodiments of FIG. 8a show a pipe 500, within which there is a portion of pipe 550 where pipe repair apparatus 400 is arranged to be positioned. A part 552 of the portion 550 is partially collapsed. Pipe 500 comprises first and second openings 502, 504 to the surface. In some embodiments of the present disclosure, the openings are existing manholes. A second tether 432 is run from a second winch 802 through second opening 504, through pipe 500, and out first opening 502. Second tether 432 is then attached to second end tether attachment point 424 (not shown) on pipe repair apparatus 400. A first tether 430 is run from a first winch 800 and attached to first end tether attachment point 406 (not shown). Also provided outside of pipe 500 is a 'push and look' camera system 700, which comprises a camera module 750. A lowering system 900 is provided at first opening 502.

Figure 8B:
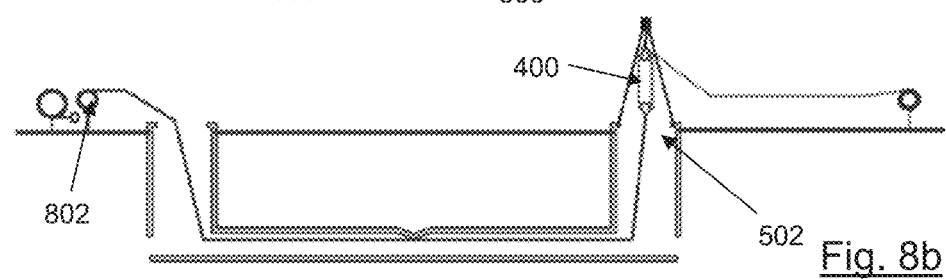

The embodiments of FIG. 8b show that prior to putting pipe repair apparatus 400 into pipe 500, pipe repair apparatus 400 is first attached by its first end to a lowering system tether 902 at the top of lowering system 900, the second end of pipe repair apparatus 400 hanging directly above first opening 502.

Figure 8C:
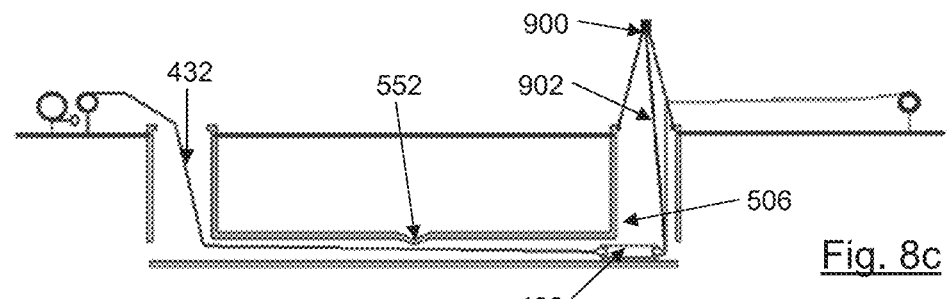

The embodiments of FIG. 8c show that lowering system 900 lowers pipe repair apparatus 400 via lowering system tether 902 into first opening 502, into pipe 506. Pipe repair apparatus 400 is arranged so that it is horizontally aligned within pipe 500.

Figure 8D:
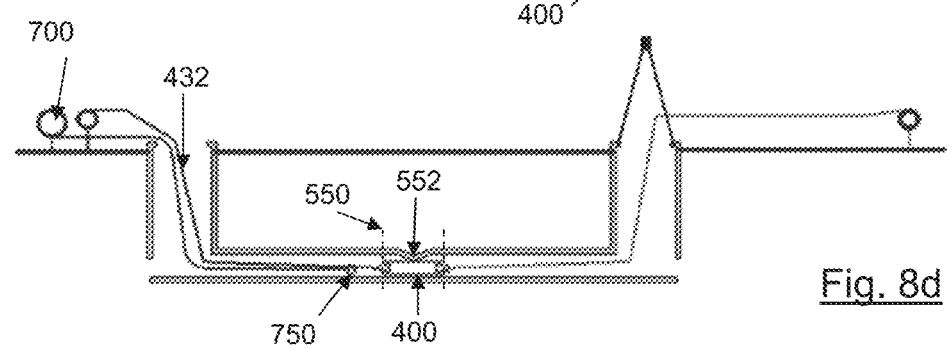

The embodiments of FIG. 8d show that pipe repair apparatus 400 is being positioned within portion of pipe 550. The positioning of pipe repair apparatus 400 (and hence actuation assembly 150) within the portion of pipe 550 comprises rolling the pipe repair apparatus along the set of wheels 404a, 404b. Lowering system tether 902 has been removed from pipe repair apparatus 400. The adjustment to the position of pipe repair apparatus 400 is made by either pulling of second tether 432, or pulling of first tether 430. The pulling of tethers 430, 432 is facilitated by winches 800, 802 respectively. Positioning pipe repair apparatus 400 within portion of the pipe 550 comprises pulling pipe repair apparatus 400 via either first tether 430 or second tether 432 attached to a respective tether attachment point (406, 424, respectively). Winches 800, 802 are controlled by an operator (not shown) positioned outside of pipe 500. 'Push and look' camera system 700 pushes camera module 750 into pipe 500 just ahead of portion of the pipe 550, so that camera module 750 observes portion of the pipe 550 and the second end of pipe repair apparatus 400. Camera module 750 transmits a video feed in real-time to the operator, such that the operator can make adjustments to the position of pipe repair apparatus 400 quickly and without the need for manual inspection of pipe 500. In the embodiments depicted in FIG. 8d, pipe repair apparatus 400 is positioned within portion of the pipe 550, and directly beneath the center of the part of the pipe that is partially collapsed 552.

Figure 8E:
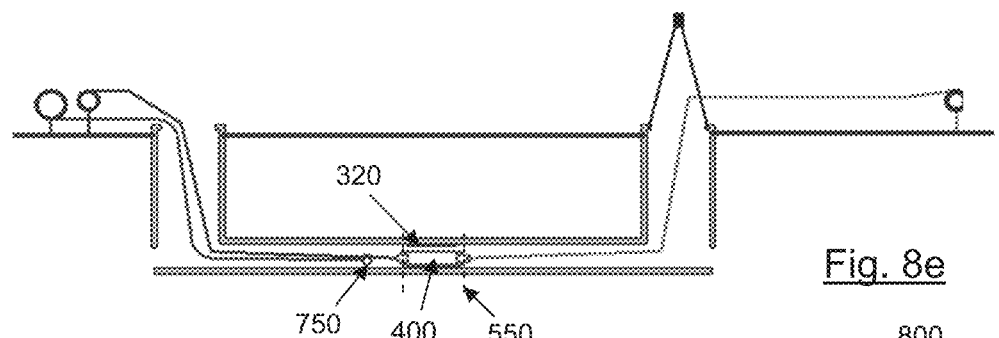

In the embodiments of FIG. 8e, pipe repair apparatus 400 (as a result of the actuation assembly) has moved between the retracted configuration, in which at least one arm 152 exerts substantially no force against the interior surface of pipe 500, to an extended configuration, in which at least one arm 152 extends outwards to exert a force against mesh stent 320 and the interior surface of pipe 500 such that the partially collapsed part of the pipe 552 changes from a partially collapsed form towards a non-collapsed form, and back to the retracted configuration. Stent 320 has been expanded and the part of the pipe that was partially collapsed 552 has been pushed outwards such that portion of the pipe 550 changes towards a non-collapsed form. Stent 320 takes the shape of portion of the pipe 550 and holds it in place, such that part of the pipe 552 does not re-collapse. Stent 320 has been permanently deformed and holds portion of the pipe 550 at substantially the same diameter as the rest of pipe 500. When portion of the pipe 550 is in the partially collapsed form, mesh stent 320 comprises a non-expanded form having a first diameter, and when portion of the pipe 550 is in the non-collapsed form, mesh stent 320 comprises an expanded form having a second diameter, the second diameter being larger than the first diameter. In alternative embodiments of the present disclosure, the portion or the pipe is fully repaired. In these alternative embodiments, the second diameter is approximately equal to a diameter of pipe 500 in the non-collapsed form. Camera module 750 in this stage of the repair transmits a video in real time to an operator so that the operator can control when the actuation of the actuation assembly (and hence the arms of the actuation assembly) has ceased, and when the arms of the actuation assembly need to be retracted. Camera module 750 allows the operator to know when part of the pipe that is partially collapsed 552 has been repaired to a non-collapsed form.

Mesh stent 320 comprising a non-expanded form and an expanded form allows the arms of the actuation assembly to, when exerting a force against the mesh stent, cause expansion of mesh stent 320. Mesh stent 320, once expanded, will be pressed against the interior surface of portion of the pipe 550, holding it in place. In embodiments of the present disclosure, mesh stent 320 deforms. The deformation may, for example, comprise plastic deformation, such that once in the expanded form, it does not inherently return to the non-expanded form. In these embodiments, mesh stent 320 can be left in place once the partially collapsed part of the pipe 552 has been changed towards the non-collapsed form, and the mesh stent will hold part of the pipe 552 in position and prevent it from returning to the collapsed form. Mesh stent 320 holds the part of the pipe 552 in place while a relining layer can then be fitted to at least the portion of the pipe 550.

Figure 8F:
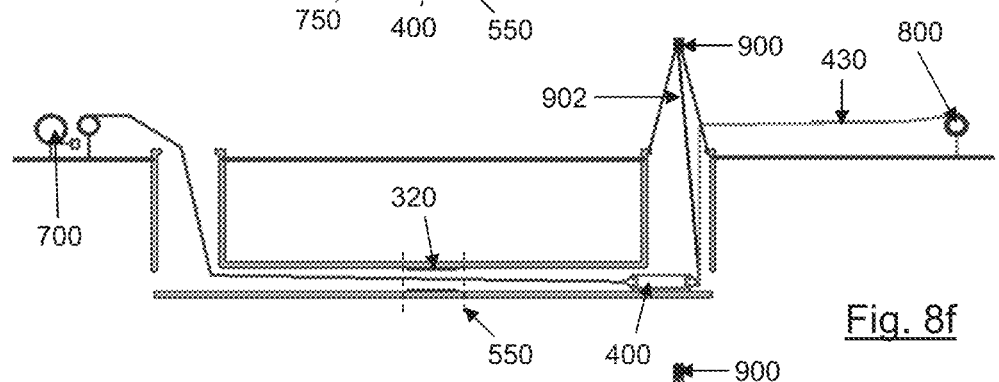

In the embodiments of FIG. 8f, pipe repair apparatus 400 has been pulled back towards first opening 502 by first tether 430, which is wound in by first winch 800. Lowering system tether 902 has been reattached to the first end of pipe repair apparatus 400. It can be seen that stent 320 has been left in place, in an expanded form, in portion of the pipe 550. Camera module 750 has been wound back in by 'push and look' camera system 700.

Figure 8G:
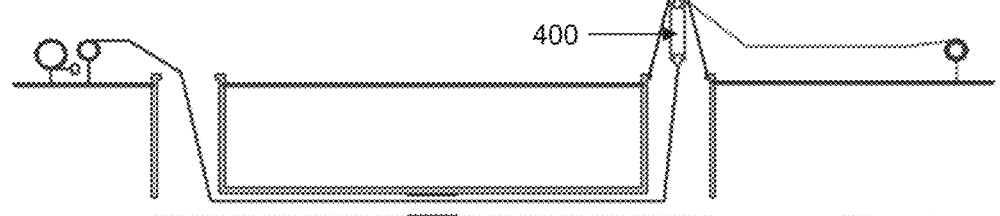

The embodiments of FIG. 8g show that lowering system 900 has pulled pipe repair apparatus 400 out of pipe 500.

Figure 8H:
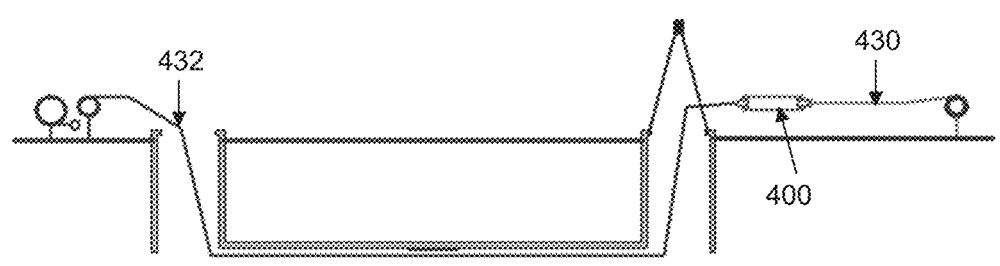

In the embodiments of FIG. 8h, lowering system tether 902 has been detached from pipe repair apparatus 400 and tethers 430, 432 can now be removed from pipe repair apparatus 400. In alternative embodiments of the present disclosure, a second mesh stent is fitted onto the outside of the actuation assembly in the event that part of the pipe that is partially collapsed 552 is longer than the length of the first mesh stent 320. Then the whole procedure as detailed in the embodiments shown in FIGS. 8a to 8h would be repeated. This is shown in more detail in the embodiments of FIG. 10.

In alternative embodiments of the present disclosure, camera module 750 is not used, and instead pipe repair apparatus 400 comprises a system of sensors (and/or a camera) that enables the operator to know when part of the pipe that is partially collapsed 552 has been changed sufficiently from a partially collapsed form towards a non-collapsed form. In alternative embodiments of the present disclosure, an on-board control module is included in pipe repair apparatus 400. The on-board control module is configured to monitor the distance by which at least one of the arms of the actuation assembly has moved. In this manner, the on-board control module can instruct the actuation assembly to cease further movement of the at least one arm of the actuation assembly once the distance monitoring indicates that the at least one arm has moved a predetermined distance. The predetermined distance corresponds to an overall diameter of the actuation assembly in the extended configuration that corresponds to the diameter of pipe 500 in its non-collapsed form. The cessation of movement of the arm acts as a safety feature, ensuring that the arms of the actuation assembly cannot be actuated to a distance that corresponds to a diameter greater than the internal diameter of the pipe in the non-collapsed form. This feature prevents over-expansion of the apparatus, stent, and portion of the pipe, preventing further damage to the partially collapsed part and non-collapsed pipe.

In alternative embodiments of the present disclosure, the operator (or user) controls and causes actuation of the actuation assembly via a control interface, by providing user input to the control interface, i.e. causing the actuation comprises receiving user input via the control interface. The control module of the pipe repair apparatus of some embodiments receives the user input from the control interface. In response to receipt of the user input at the control module, the control module may instruct the actuation assembly to move between the retracted configuration and the extended configuration. In alternative embodiments of the present disclosure, the control interface comprises a wired or wireless electronic remote control. The control interface transmits the user input wired or wirelessly to the control module of the pipe repair apparatus.

In embodiments of the present disclosure, the apparatus comprises one or more cameras configured to monitor positioning of the pipe repair apparatus in the pipe, and wherein in response to a user input received from a user viewing the camera at the control interface, the control interface instructs the actuation assembly to cease further movement of at least one arm.

Viewing of the camera at the control interface allows the operator to control the pipe repair apparatus while receiving visual feedback from their inputs in real time. This means that there is no need to inspect the pipe after the repair method has been performed, thus saving time.

The control module of alternative embodiments of the present disclosure executes a computer program comprising a set of instructions. The set of instructions may cause actuation of at least one of the arms of the actuation assembly, between a retracted configuration, and an extended configuration, such that the partially collapsed part of the pipe changes from a partially collapsed form towards a non-collapsed form.

Figure 9:
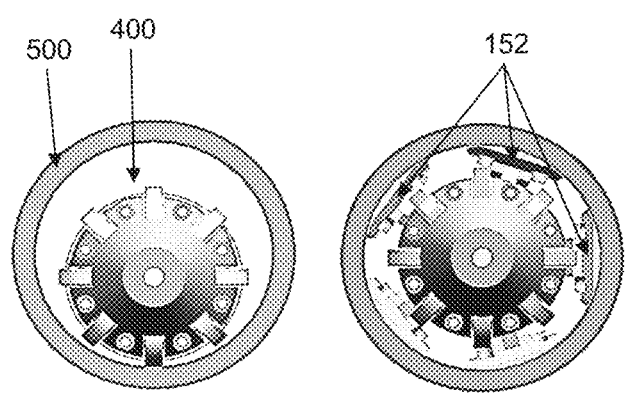
FIG. 9 shows the actuation of the pipe repair apparatus within a pipe, according to embodiments of the present disclosure.

The embodiments of FIG. 9 show a view that camera module 750 can see when inside pipe 500, as in the embodiments of FIG. 8e. This view observes the second end of pipe repair apparatus 400. The view shown on the left of FIG. 9 is when pipe repair apparatus 400 is in the retracted configuration. On the right, the pipe repair apparatus is in the extended configuration. In this configuration, the arms 152 have been actuated and are extending outwards to exert a force against the interior surface of pipe 500. In the embodiments of FIG. 9, pipe 500 is in a non-collapsed form, the non-collapsed form being substantially cylindrical in shape. In alternative embodiments of the present disclosure, pipe 500 is a shape that is non-cylindrical. Pipe 500 may be a semi-circular, or an oval, for example.

Figure 10:
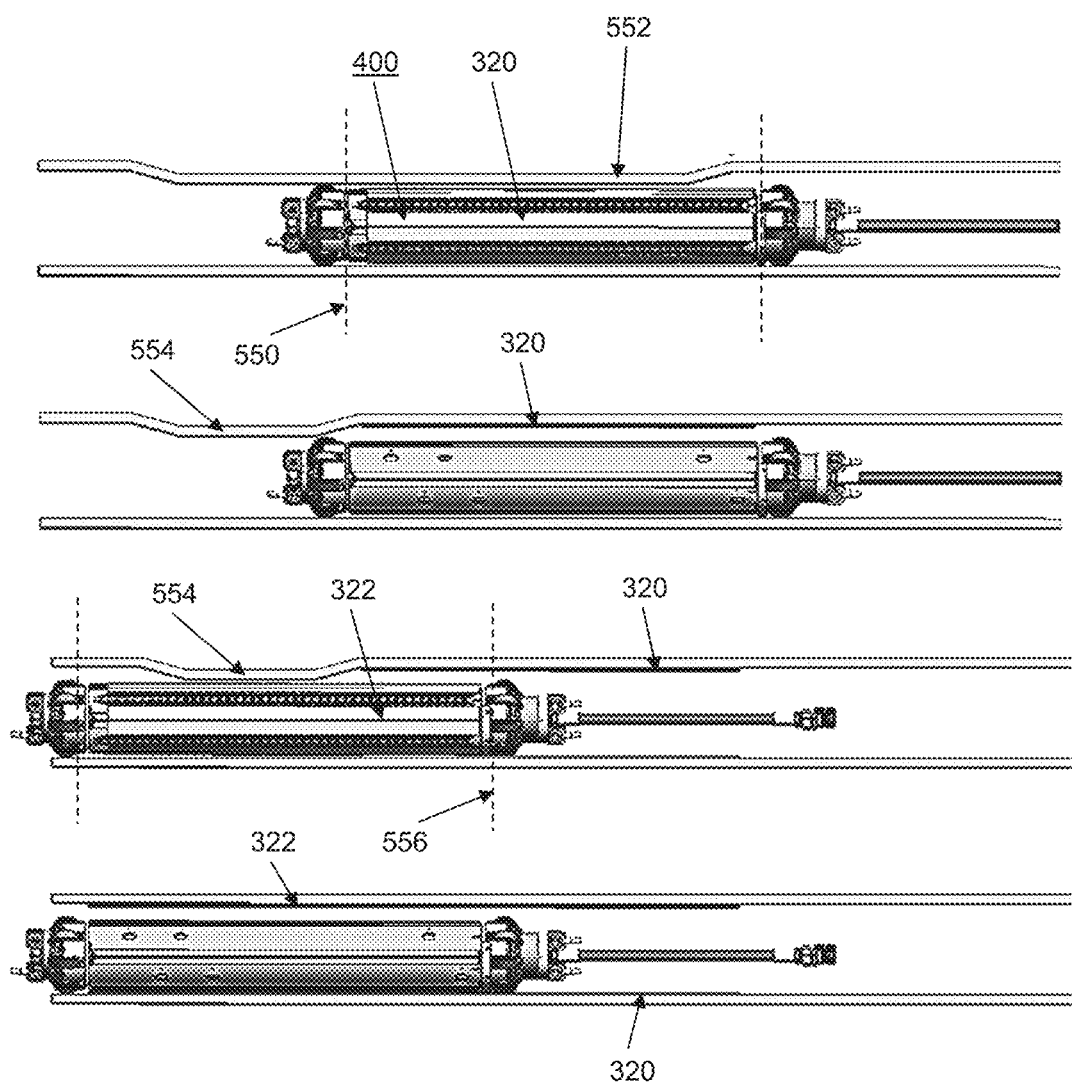
FIG. 10 shows a cross-sectional view of a pipe repair apparatus repairing a partially collapsed pipe according to embodiments of the present disclosure.

FIG. 10 shows how pipe repair apparatus 400 can be used to repair part of the pipe that has been partially collapsed 552 that is longer than the length of stent 320, according to embodiments of the present disclosure. First, the process as detailed in the embodiments of FIGS. 8a to 8h are performed. A difference in these embodiments is that portion of the pipe 550 in which the pipe repair apparatus is positioned only contains a section of part of the pipe that is partially collapsed 552. Portion of the pipe 550 overlaps with some pipe 500 that is in the non-collapsed form. This is so that when the stent is expanded, it provides more tolerance for error in the positioning, and more structural integrity surrounding the partially collapsed sections of pipe.

Once a section of part of the pipe that is partially collapsed 552 has been repaired, a second stent 322 is loaded onto the actuation assembly and the process of the embodiments of FIGS. 8a to 8h is again repeated. This time, however, the portion 556 overlaps: a part of where first stent 320 was placed within the pipe 500; the remaining part of the pipe that is partially collapsed 554; and a section of pipe 500 that is in the non-collapsed form. In this manner, part of the pipe that is partially collapsed 552 can be any length, and pipe repair apparatus 400 can be used to repair these partially collapsed parts by using successively deployed stents 320 to accommodate the length.

Whilst the present disclosure has been described and illustrated with reference to particular embodiments, it will be appreciated by those of ordinary skill in the art that the present disclosure lends itself to many different variations not specifically illustrated herein. By way of example only, certain possible variations will now be described.

In alternative embodiments of the present disclosure, after pipe 500 has been repaired as described above, a relining layer is fitted to at least portion of the pipe 550 after pipe repair apparatus 400 has been removed from pipe 500. Portion of the pipe 550 comprises (formerly) partially collapsed part of the pipe 552, and at least one mesh stent 320 in an expanded form. In embodiments of the present disclosure, the relining layer is fitted inside of the mesh stent. In embodiments of the present disclosure, the relining layer overlaps both the inner surface of mesh stent 320, and the inner surface of pipe 500, the inner surface of pipe 500 being in the non-collapsed form. The relining layer may comprise a cured-in-place pipe (CIPP). CIPP is compatible with trenchless repair operations, and may extend the lifetime of pipe 500 compared to without the use of CIPP. Due to the nature of some collapses, it may not be possible to apply CIPP immediately.

The use of a relining layer provides extra structure to the pipe, and improves the durability and lifetime of the pipe.

The use of CIPP ensures that the part of the pipe that was partially collapsed is waterproof. Fitting CIPP is also a trenchless operation, meaning that no excavation is required of the pipe.

The second alignment portion may be located equidistant between two arms of the plurality of arms of the pipe repair apparatus. This helps prevent the mesh stent sliding circumferentially around the outside of the actuation assembly, such that the mesh portions are centrally aligned with the arms of actuation assembly, thus providing optimal and uniform expansion of the mesh stent.

Alternative embodiments of the present disclosure comprise a computer program comprising a set of instructions, which, when executed by a control module of a pipe repair apparatus, cause the computerized device to perform a method of repairing a partially collapsed pipe, the pipe repair apparatus having been positioned within a portion of the pipe, at least a part of the portion of the pipe being partially collapsed, a mesh stent having been fitted around the outside of an actuation assembly of a pipe repair apparatus, the actuation assembly comprising a plurality of arms, the method comprising: causing actuation, of at least one of the arms in the plurality of arms, between a retracted configuration in which the at least one arm exerts substantially no force against an interior surface of the pipe, and an extended configuration in which the at least one arm extends outwards to exert a force against the mesh stent and the interior surface of the pipe, such that the partially collapsed part of the pipe changes from a partially collapsed form towards a non-collapsed form.

What is claimed is:

1. A pipe repair apparatus for repairing partially collapsed pipes, the pipe repair apparatus comprising:
   an actuation assembly comprising:
      a plurality of actuation arms;
      a plurality of hydraulic cylinders; and
      a plurality of hydraulic lines, wherein each hydraulic line in the plurality of hydraulic lines supplies hydraulic fluid to a respective hydraulic cylinder in the plurality of hydraulic cylinders, wherein each hydraulic cylinder in the plurality of hydraulic cylinders is configured to move a respective actuation arm in the plurality of actuation arms between a retracted configuration and an extended configuration to move a partially collapsed part of a partially collapsed pipe from a partially collapsed form to a non-collapsed form; and
   a control module configured to control each individual hydraulic line in the plurality of hydraulic lines such that each actuation arm in the plurality of actuation arms is actuated independently, wherein the control module is configured to control at least two of the hydraulic lines in the plurality of hydraulic lines such that at least one of the actuation arms in the plurality of actuation arms applies a different force to the partially collapsed pipe compared to at least one other actuation arm in the plurality of actuation arms.

2. The pipe repair apparatus of claim 1, wherein the control module is configured to control an amount and/or a force of hydraulic fluid in each individual hydraulic line in the plurality of hydraulic lines such that each actuation arm in the plurality of actuation arms is actuated independently.

3. The pipe repair apparatus of claim 1, wherein the control module is configured to control each of the hydraulic lines in the plurality of hydraulic lines such that each of the actuation arms in the plurality of actuation arms applies a different force to the partially collapsed pipe compared to each other actuation arm in the plurality of actuation arms.

4. The pipe repair apparatus of claim 1, wherein the control module is configured to control at least two hydraulic lines in the plurality of hydraulic lines such that the plurality of actuation arms apply less total force to the partially collapsed pipe in a horizontal direction compared to in a vertical direction.

5. The pipe repair apparatus of claim 1, wherein the control module is configured to control each hydraulic line in the plurality of hydraulic lines as a function of a resistance to movement that each respective actuation arm in the plurality of actuation arms experiences within the partially collapsed pipe during actuation of the actuation assembly from the retracted configuration to the extended configuration.

6. The pipe repair apparatus of claim 1, wherein actuation arms in the plurality of actuation arms are distributed around a circumference of the actuation assembly.

7. The pipe repair apparatus of claim 1, wherein the control module is configured to control an amount and/or a force of hydraulic fluid in each hydraulic line in the plurality of hydraulic lines such that when a given actuation arm in the plurality of actuation arms is in the retracted configuration, the respective hydraulic line in the plurality of hydraulic lines supplies a lower amount of hydraulic fluid and/or a lower force of hydraulic fluid than when the given actuation arm is in the extended configuration.

8. The pipe repair apparatus of claim 1, wherein the control module is configured to monitor a distance by which each actuation arm of the plurality of actuation arms has moved away from the retracted configuration.

9. The pipe repair apparatus of claim 1, wherein the pipe repair apparatus comprises one or more cameras, and the control module is configured to monitor a distance by which each actuation arm in the plurality of actuation arms has moved away from the retracted configuration using the one or more cameras.

10. The pipe repair apparatus of claim 1, wherein the pipe repair apparatus comprises a system of sensors, and the control module is configured to monitor a distance by which each actuation arm in the plurality of actuation arms has moved away from the retracted configuration using the system of sensors.

11. The pipe repair apparatus of claim 1, wherein the control module is configured to:
monitor a distance by which each actuation arm of the plurality of actuation arms has moved away from the retracted configuration; and
instruct the actuation assembly to cease further movement of each actuation arm of the plurality of actuation arms when the control module detects that a respective actuation arm has moved a pre-determined distance from the retracted configuration.

12. A system for repairing partially collapsed pipes, the system comprising:
a pipe repair apparatus for repairing partially collapsed pipes, the pipe repair apparatus comprising:
an actuation assembly comprising:
a plurality of actuation arms;
a plurality of hydraulic cylinders; and
a plurality of hydraulic lines, wherein each hydraulic line in the plurality of hydraulic lines supplies hydraulic fluid to a respective hydraulic cylinder in the plurality of hydraulic cylinders, wherein each hydraulic cylinder in the plurality of hydraulic cylinders is configured to move a respective actuation arm in the plurality of actuation arms between a retracted configuration and an extended configuration to move a partially collapsed part of a partially collapsed pipe from a partially collapsed form to a non-collapsed form; and
a control module configured to control each individual hydraulic line in the plurality of hydraulic lines such that each actuation arm in the plurality of actuation arms is actuated independently; and
a mesh stent, wherein:
the mesh stent is configured to be fitted around an outside of the actuation assembly of the pipe repair apparatus when the plurality of actuation arms are in the retracted configuration; and
in response to the control module controlling a given hydraulic line in the plurality of hydraulic lines such that a given actuation arm in the plurality of actuation arms moves from the retracted configuration to the extended configuration, the given actuation arm exerts a force against the mesh stent and an interior surface of the partially collapsed part of the partially collapsed pipe, such that a part of the partially collapsed pipe changes from the partially collapsed form towards the non-collapsed form.

13. The system of claim 12, wherein:
the mesh stent comprises at least one first alignment portion;
the pipe repair apparatus comprises at least one second alignment portion; and
the at least one second alignment portion is configured to align with the at least one first alignment portion when the mesh stent is fitted around the outside of the actuation assembly.

14. The system of claim 12, wherein:
the mesh stent comprises at least one first alignment portion;
the pipe repair apparatus comprises at least one second alignment portion;
the at least one second alignment portion is configured to align with the at least one first alignment portion when the mesh stent is fitted around the outside of the actuation assembly; and
one or more of the at least one first alignment portion and the at least one second alignment portion comprise a ridge that prevents the mesh stent from sliding circumferentially around the outside of the actuation assembly.

15. A pipe repair apparatus for repairing partially collapsed pipes, the pipe repair apparatus comprising:
an actuation assembly comprising:
a plurality of actuation arms, wherein each actuation arm is configured to move between a retracted configuration and an extended configuration to move a partially collapsed part of a partially collapsed pipe from a partially collapsed form to a non-collapsed form; and
a control module configured to control each individual actuation arm in the plurality of actuation arms independently, wherein the control module is configured to control at least two of the plurality of actuation arms such that at least one of the actuation arms in the plurality of actuation arms applies a different force to the partially collapsed pipe compared to at least one other actuation arm in the plurality of actuation arms.

16. The pipe repair apparatus of claim 15, wherein the control of each individual actuation arm comprises one or more of the following:
hydraulic actuation, pneumatic actuation, or
mechanical actuation.

17. The pipe repair apparatus of claim 15, wherein the control module is configured to control each of the actuation arms in the plurality of actuation arms such that each of the actuation arms in the plurality of actuation arms applies a different force to the partially collapsed pipe compared to each other actuation arm in the plurality of actuation arms.

18. The pipe repair apparatus of claim 15, wherein the control module is configured to control at least two actuation arms in the plurality of actuation arms such that the plurality of actuation arms apply less total force to the partially collapsed pipe in a horizontal direction compared to in a vertical direction.

19. The pipe repair apparatus of claim 15, wherein the control module is configured to control each actuation arms in the plurality of actuation arms as a function of a resistance to movement that each respective actuation arm in the plurality of actuation arms experiences within the partially collapsed pipe during actuation of the actuation assembly from the retracted configuration to the extended configuration.

20. The pipe repair apparatus of claim 15, wherein the control module is configured to monitor a distance by which each actuation arm of the plurality of actuation arms has moved away from the retracted configuration.

* * * * *